Nov. 13, 1962 R. A. FRYKLUND 3,064,115
WELDING APPARATUS
Filed June 17, 1959 3 Sheets-Sheet 1

INVENTOR
ROBERT A. FRYKLUND
BY *H Vincent Harsha*

ATTORNEY

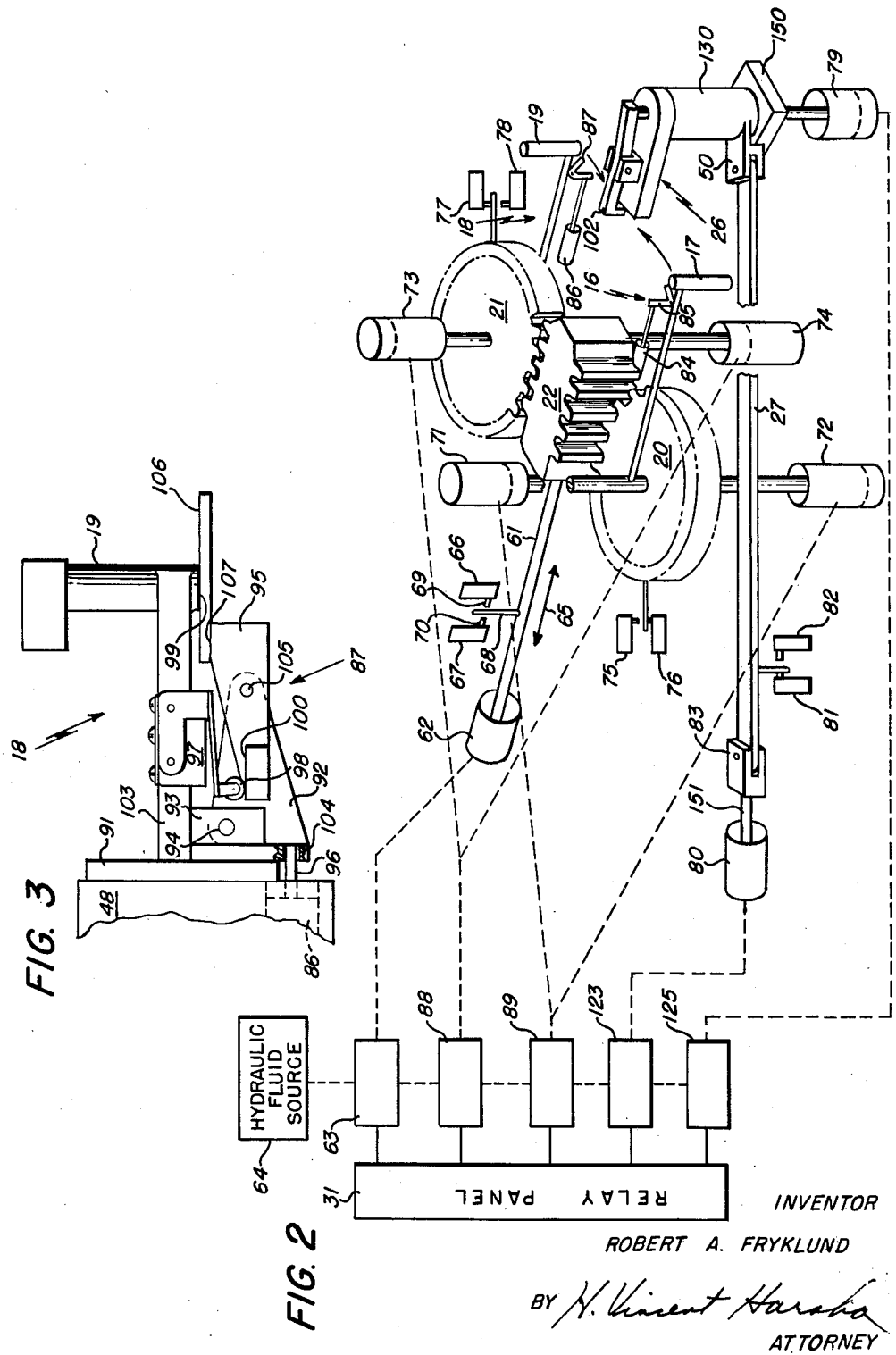

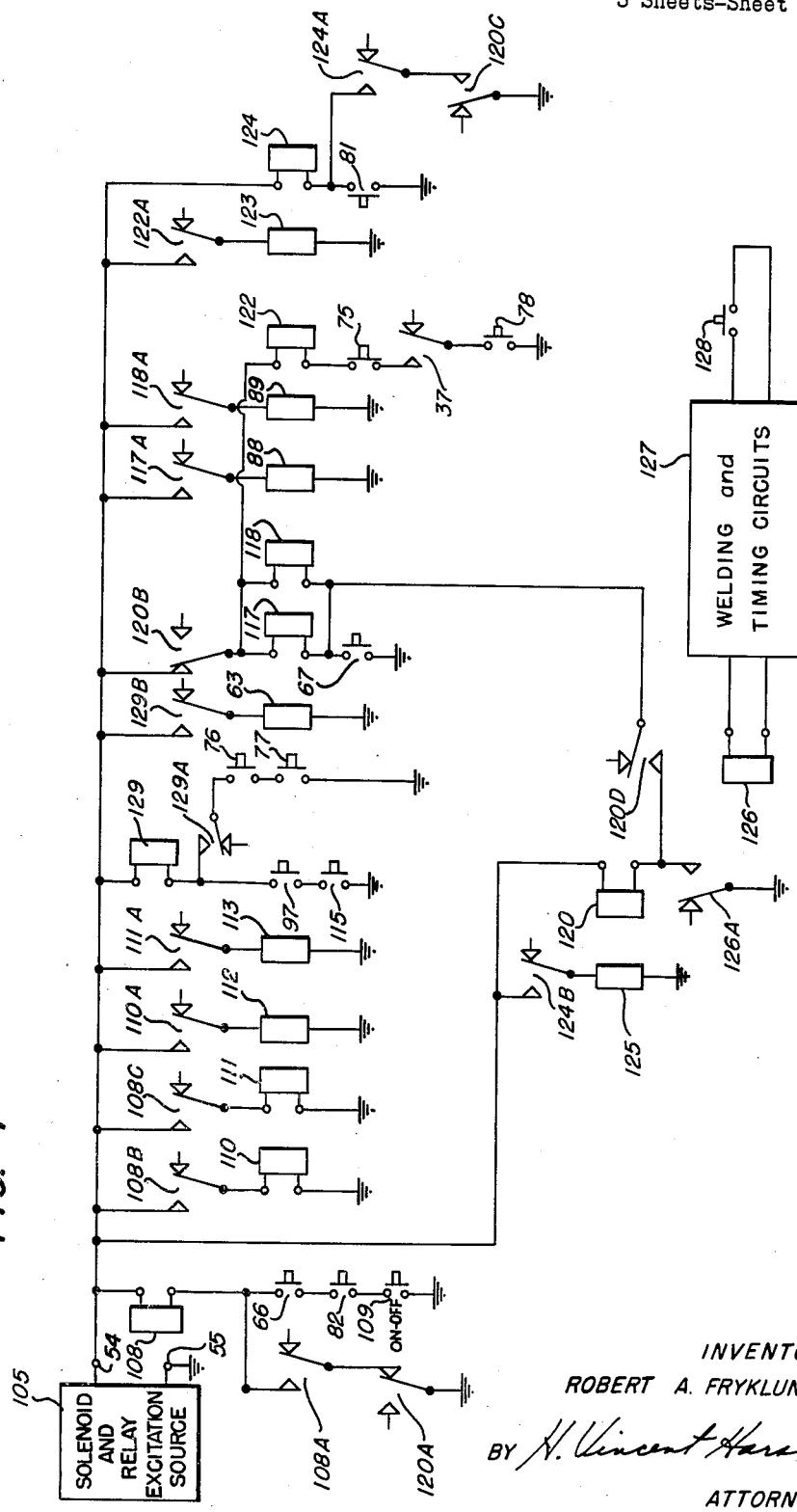

United States Patent Office 3,064,115
Patented Nov. 13, 1962

3,064,115
WELDING APPARATUS
Robert A. Fryklund, Dedham, Mass., assignor to Raytheon Company, Waltham, Mass., a corporation of Delaware
Filed June 17, 1959, Ser. No. 820,995
6 Claims. (Cl. 219—78)

This invention relates generally to welding apparatus and, more particularly, to automatically operated welding apparatus capable of being utilized for a large variety of welding operations and adaptable for use in an automatic production line system.

Welding electrodes used in present day equipment are rigidly mounted and capable of motion only in a vertical direction. In such conventional welding apparatus, the workpieces to be welded generally are preassembled in a jig or positioning device and are carried to their welding position and held between the welding electrodes either by hand or by rather cumbersome equipment not integrated with the welding apparatus itself. After the welding operation is completed, the workpieces are removed either manually or by using the same, or similar, equipment and are carried away from the welding position to whatever location is desired for subsequent operations. The rigid construction of such welding machines and the cumbersome methods of handling the workpieces reduce the number of applications which these machines may handle and limits their general use in automatic production line equipment.

The welding apparatus of the invention, however, utilizes a pair of welding electrode arms that are capable of motion in more than one direction. In a specific embodiment of the invention, the arms are arranged so that they can be automatically swung outwardly from and inwardly toward their welding position. Furthermore, in the welding apparatus of the invention, prehensile members are mounted on said arms and are automatically controlled to grasp and hold the workpieces which are to be welded. The workpieces are automatically picked up and carried by the movable welding arms from their outwardly swung position to a position where welding occurs. The invention also provides a middle, or pickup, arm equipped with a prephensile member and capable of swinging toward and away from the welding arms. When the welding arms swing into the welding position, the prehensile member associated with the middle arm is used to grasp and hold the workpieces which can then be carried away after the welding process has been completed. The welding arms are then automatically returned to their initial positions so that the process may be repeated.

The structure of the invention is easily adapted to the welding of more than two workpieces since, in that case, the middle arm may be used to grasp and carry a third workpiece to the welding position where it is placed in a position to be welded to the workpieces carried by the welding electrode arms. After completion of the welding of the three pieces, the middle arm is used, as before, to grasp the completed welded assembly and carry it away from the welding position to the next stage of production.

The movements of the arms and the prehensile members associated with them are controlled by a suitable actuation system capable of being programmed for any desired sequence of operations by utilizing appropriate patchboard interconnections of relays, switches, and solenoid valves. Moreover, the electrodes and prehensile members that are attached to the movable arms are easily changed so that electrodes and prehensile members of different shapes and sizes may be used for specific welding operations. Thus, the invention is generally adaptable for a wide variety of welding applications. This versatility of operation represents a great savings in time and money. With the apparatus of the invention, many welding operations which have previously required unique apparatus design may now be accomplished by merely selecting appropriate electrodes and prehensile members and appropriate interconnections of the relays, switches, and actuation devices of the invention.

The invention may be more easily described with the help of the accompanying drawing wherein:

FIG. 2 shows a partially diagrammatic and partially pictorial view of a simplified representation of the mechanical and electrical system of a part of the invention;

Figure 1:
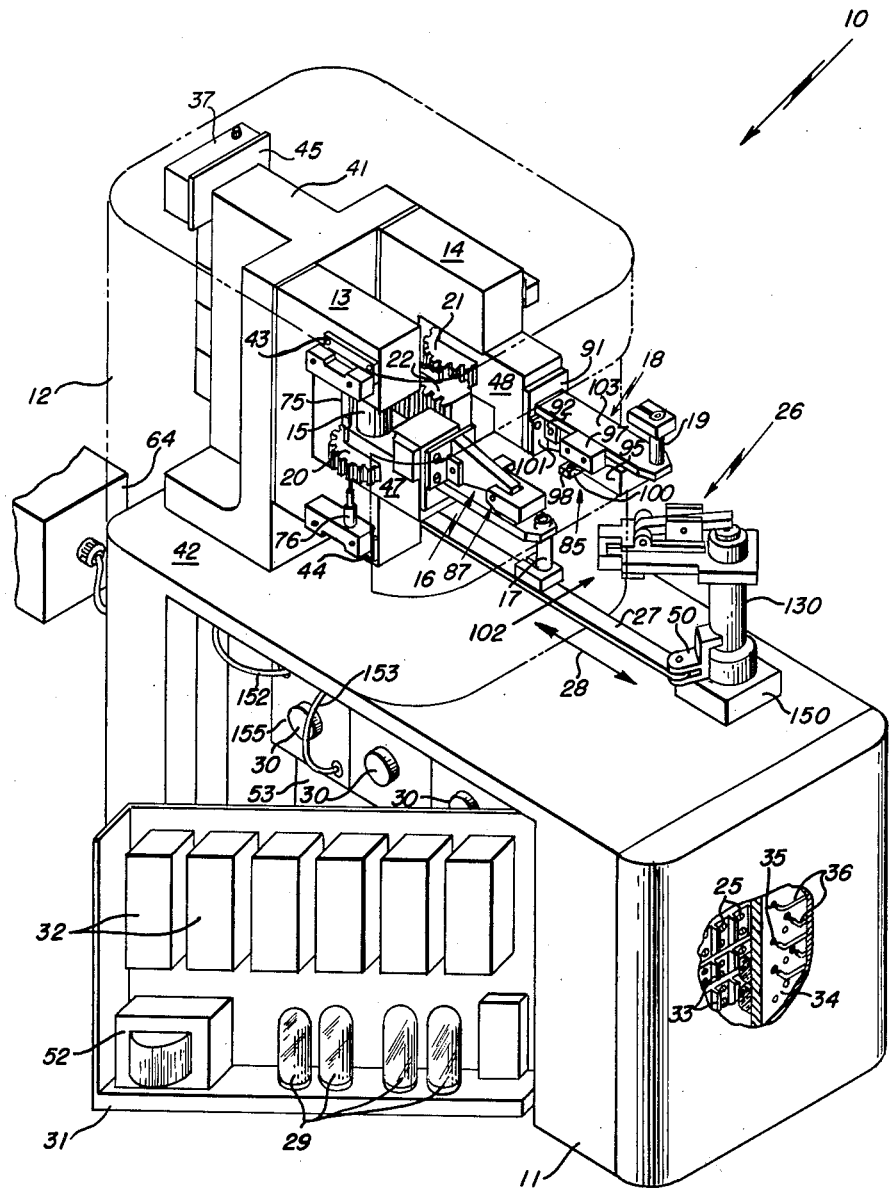
FIG. 1 shows a general pictorial view of a specific embodiment of the welding apparatus of the invention showing the locations of the movable arms, the prehensile members, and associated mechanical and electrical control means which characterize the invention.

FIG. 3 shows a detailed plan view of a specific embodiment of a part of the invention comprising a prehensile member and a portion of a welding electrode arm; and FIG. 4 shows a partial schematic and partial block diagram of the relays, switches, and solenoid valve interconnections required for a specific sequence of operations for a particular welding process that may be performed by the apparatus of the invention.

In FIG. 1 there is shown a welding apparatus 10 comprised of two principal parts, a lower section 11, and an upper section 12. The housing of upper section 12 is shown in phantom view to expose the mounting structure for the welding arms of the apparatus. Upper section 12 includes a pair of U-shaped brackets 13 and 14 mounted on a T-shaped mounting structure 41 secured to a base 42 which separates sections 11 and 12. A pair of supporting posts are attached across the open ends of U-shaped brackets 13 and 14. Post 15 is shown secured to bracket 13 while the post associated with bracket 14 is hidden in the drawing. These posts support a movable arrangement of welding electrode arms comprising a first arm 16 having a welding electrode 17 and a second arm 18 having a welding electrode 19. Arms 16 and 18 are attached to L-shaped mounting brackets 47 and 48 which are, in turn, pivotally mounted on the supporting posts associated with U-shaped brackets 13 and 14, respectively.

A pair of pinion gears 20 and 21 are also pivotally mounted on the supporting posts and are attached to mounting brackets 47 and 48, respectively. Gears 20 and 21 are caused to mesh with the teeth of a movable rack 22, which is actuated by a suitable actuation device, not shown in this figure but described more specifically with reference to FIG. 2. As rack 22 moves linearly in a forward or rearward direction, pinion gears 20 and 21 rotate so as to cause electrode arms 16 and 18 to swing toward and away from each other. When arms 16 and 18 are in their inwardly swung positions, the outer end of arm 18 is positioned directly above the outer end of arm 16. This position is hereinafter designated as the welding position.

A movable middle arm 26 is shown pivotally mounted on a post 130 so as to swing toward and away from the welding arms 16 and 18. The rotation of middle arm 26 is provided by the movement of connecting rod 27 attached at one end to an actuation device (not shown in this figure) and at the other end to post 130 through suitable coupling means 50. When connecting rod 27 is moved linearly along the direction of arrow 28, the outer end of middle arm 26 swings toward and away from a point adjacent the welding position of arms 16 and 18.

Mounted at each of the outer ends of welding arms 16 and 18 and middle arm 26 are prehensile members 85, 87, and 102, respectively. The operation of a specific embodiment of the members 85, 87, or 102 is described more fully in FIG. 3. The prehensile members are capable of grasping and holding workpieces that are to be welded. In one embodiment of the invention, members 85 and 87 associated with arms 16 and 18, respectively, pick up the workpieces from one stage of the production operation and carry them to the welding position, at which point middle arm 26 swings inwardly and member 102 also grasps the workpieces. After the welding operation is completed, members 85 and 87 release their hold on the workpieces and middle arm 26 swings outwardly and carries the welded pieces to the next stage of production.

A more detailed description of the means for actuating the movement of electrode arms 16 and 18, middle arm 26, and prehensile members 85, 87, and 102 is described below with reference to FIGS. 2, 3, and 4.

Lower section 11 of welding apparatus 10 contains power supplies, electronic welding and control circuits, and a portion of the hydraulic actuation equipment required for the automatic operation of the welding apparatus. A swinging panel 31 is hingedly attached at one side of section 11. Panel 31 has mounted thereon electrical apparatus such as relays 32, electron tubes 29, and transformer 52. These elements are a portion of the equipment required to provide a selected sequence of operations for the welding process desired.

A second panel 53 is fixedly secured within the interior of lower section 11 and has mounted thereon a plurality of solenoid valves 30 used for controlling the operation of the actuation means which are used to move the arms and prehensile members of the invention. The actuation means may be conventional piston-cylinder devices actuated by hydraulic fluid, such as oil or air. An input hose 152 and an output hose 153 are shown connected ot a valve 155 mounted on panel 53. Input hose 152 receives hydraulic fluid from a source 64 through a connection (not shown) at the rear of lower panel 11. Source 64, which is partially shown in the figure, represents a suitable conventional high pressure supply system. Output hose 153 supplies fluid to a piston-cylinder device (not shown) in response to the operation of valve 155. Similar hose connections are used for other valves although, for clarity, they are not shown in this figure. The piston-cylinder devices associated with these valves are not shown in FIG. 1 but are more fully explained with reference to FIG. 2.

Mounted at the front end of lower section 11 are a plurality of terminal strips 33. Terminals 25 of terminal strips 33 are connected through suitable cables (not shown) to the relay coils, relay contacts, solenoid coils, and switches utilized by the welding apparatus. A patchboard panel 34 is mounted adjacent terminal strips 33. Each of the jacks 35 of patchboard panel 34 is maintained in electrical contact with a corresponding terminal of terminal strips 33. Thus, it is possible to interconnect the terminals of terminal strips 33 in any desired manner by merely interconnecting appropriate jacks by means of cables 36 having suitable plugs mounted on their ends. The construction of the terminal strips and patchboard panel used in the invention is well known in the art and is similar to that used in conventional computer devices, or the like.

A plurality of microswitches are mounted at suitable locations on upper section 12 so as to be operated at appropriate times throughout the sequence of operations of the invention. For purposes of clarity, not all of the microswitches which are utilized in the apparatus are shown in FIG. 1. An example of one set of microswitches that is utilized by the embodiment of the invention shown in FIG. 1 are microswitches 75 and 76 attached to the upper and lower portions of U-shaped bracket 13 by mounting blocks 43 and 44, respectively. In the particular embodiment described, microswitch 75 is normally opened in its unoperated condition and microswitch 76 is normally closed in its unoperated condition. When welding arm 16 is in a lowered position (as shown in the figure), microswitch 76 is operated and microswitch 75 is not operated. Thus, under this condition, both switches are opened. When electrode arm 16 is in a raised position, microswitch 75 is operated and microswitch 76 is not operated. Thus, under this condition, both switches are closed. A similar set of microswitches (not shown in this figure) is mounted on bracket 14 and operated in cooperation with the vertical movement of welding arm 18. Other microswitches (also not shown in this figure) are operated when arms 16, 18, and 26 are moved to their extreme inward and outward positions and when prehensile members 85, 87, and 102 grasp or release the workpieces that are being welded. The purpose and operation of these microswitches is more fully explained with the help of FIGS. 2, 3, and 4.

A pressure switch 37 is attached to structure 41 by mounting plate 45 at the rear of upper section 12. Switch 37 is a conventional type which is operated when the pressure used in the welding process reaches a predetermined required value for welding. The contacts of pressure switch 37 are connected by suitable cabling (not shown) to appropriate terminals of terminal strip 33 so that switch 37 can be suitably interconnected as part of the sequencing control system.

Additional equipment of the type shown mounted on panels 31 and 53 may be mounted on similar panels available at the other side of lower section 11.

In FIG. 2 there is shown a simplified mechanical actuation system required to provide the desired movement of the movable arms and prehensile members utilized in the invention. This figure is not to be construed as indicating the actual physical configuration of the components involved. For example, the construction of the piston-cylinder devices and the microswitch devices utilized is well known to those in the art. The devices as shown here are illustrative only of the principles of operation involved and do not represent the structures which may actually be used and which are partially shown pictorially in FIG. 1. FIG. 2 is merely used to simplify the explanation of the operation of the actuation means required for performing a desired welding task. Where possible, the reference numerals of the illustrative components of FIG. 2 coincide with the reference numerals of the actual components shown in the general pictorial view of FIG. 1.

In FIG. 2, rack 22 is shown in substantially a central position with respect to its points of maximum linear excursion. Pinion gear 20 is shown in a lowered position so as to mesh with the lower portions of the teeth of rack 22. Pinion gear 21 is shown in a raised position so that its teeth are meshed with the upper portions of the teeth of rack 22. Rack 22 is moved by a shaft 61 connected to a piston-cylinder device 62. Piston-cylinder device 62 is actuated by conventional hydraulic fluid, such as oil, air, or other suitable fluids. The fluid is fed from a source 64 through a solenoid valve 63 to one or the other side of a piston in accordance with the opening and closing of suitable ports in valve 63. The operation of solenoid valve 63 allows the fluid to enter into chambers at one or the other side of the piston to cause the piston to move shaft 61 in one direction or another. Because the operation of solenoid valves and piston-cylinder devices such as these is quite well known in the art, no attempt is made here to go into the details of their structure and, hence, they are shown here in this simplified diagrammatical fashion. The excitation coil of solenoid valve 63 is connected to a set of relay contacts mounted on hinged panel 31 so that the valve is energized in its correct sequential relationship with the other equipment used in a specific welding operation. The sequence of operations of the solenoid valves, microswitches, and relay contacts involved is described more fully in conjunction with the circuit diagram of FIG. 4.

The actuation of piston-cylinder device 62 causes shaft 61 to move rack 22 forward or rearward along one or the other of the directions of arrow 65. When rack 22 reaches its furthest excursion in the forward direction, arms 16 and 18 are located in their outwardly swung position and microswitch 66 is operated. When rack 22 reaches its furthest excursion in a rearward direction, arms 16 and 18 are in the inwardly swung position (the welding position) and microswitch 67 operates. Microswitches 66 and 67 are normally opened in their unoperated condition. FIG. 2, for purposes of simplicity, shows this operation of microswitches 66 and 67 to be caused by the pressure of a rod 68 (attached to shaft 61) upon microswitch push buttons 69 or 70. As explained above, this specific means for operating switches 66 and 67 is illustrative only and does not represent necessarily the actual structural means which may be used in a particular embodiment of the invention.

The motion of rack 22 in either the forward or rearward direction causes gears 20 and 21 to rotate about their vertical axes so as to cause the ends of arms 16 and 18 to be swung toward and away from each other. When rack 22 is moved to its furthest rearward position, arms 16 and 18 are swung inwardly to the welding position so that welding electrodes 17 and 19 are vertically aligned.

In the welding position, the welding electrodes 17 and 19 are capable of being raised and lowered in the vertical direction to bring the electrode ends toward and away from each other. The raising or lowering of arms 16 and 18 is brought about by the actuation of piston-cylinder devices 71—74 in a manner similar to that discussed with respect to the actuation of rack 22 by piston-cylinder device 62. Devices 71—74 are actuated by the operation of four-way solenoid valves 88 and 89, the coils of which are in turn connected to appropriate relay contacts on relay panel 31.

Prehensile members 85 and 87, which are shown here as simplified V-shaped structures for purposes of illustration only, are used to grasp and hold the workpieces to be welded at the electrode ends of arms 16 and 18, respectively. Members 85 and 87 are actuated by piston-cylinder devices 84 and 86, respectively, which are, in turn, caused to operate by the operation of solenoid valves 112 and 113, which, for clarity, are not shown in the figure.

When pinion gears 20 and 21 are in raised positions, microswitches 75 and 77 are operated. When gears 20 and 21 are in lowered positions, microswitches 76 and 78 are operated. In the welding structure of the invention, the operation of these switches may be provided by pressure contact with the upper and lower surfaces of gears 20 and 21. This operation is specifically shown in FIG. 1 with respect to switches 75 and 76 wherein the switches make contact with the upper and lower surfaces of gear 20.

The rotation of middle arm 26 is provided by piston-cylinder device 80, which causes connecting rod 27 to move in a substantially linear fashion and, thus, causes rotation of post 130, which is pivotally mounted on bracket 150 and which is attached at its upper end to middle arm 26. Connecting rod 27 is connected at one end to shaft 151 of piston-cylinder device 80 through coupling means 83 and at the other end to post 130 through coupling means 50. Piston-cylinder device 80 is actuated by solenoid valve 123 which is energized through connections to appropriate relay contacts on relay panel 31. Motion of connecting rod 27 causes the operation of microswitches 81 and 82 at the extreme limits of its travel. Prehensile member 102 of middle arm 26 is actuated by piston-cylinder device 79, which is, in turn, actuated by solenoid valve 125 connected to appropriate relay contacts for correct sequencing of its operation.

Thus, middle arm 26 is caused to rotate toward and away from welding arms 16 and 18. As explained in more detail in the following paragraphs, when prehensile members 85 and 87 of welding arms 16 and 18 hold the workpieces in a position for welding, middle arm 26 is caused to rotate toward the workpieces so that prehensile member 102, attached to arm 26, can also grasp and hold the workpieces. After the welding operation is completed, members 85 and 87 release the welded pieces and middle arm 26 is returned to its initial outward position. The welded pieces, thus, are carried to another stage of production by member 102 of middle arm 26.

The operation of the prehensile members of the invention may be most easily described with the help of FIG. 3 which shows a detailed plan view of member 87 of welding arm 18. The operation of prehensile members 85 and 102 of welding arm 16 and middle arm 26, respectively, are substantially the same as that described for welding arm 18. In FIG. 3, there is shown a supporting arm 103 mounted on a backing plate 91 which is in turn secured to L-shaped bracket 48. Electrode 19 is secured to the outer end of supporting arm 103. A movable piece 92 is pivotally mounted at point 94 to a bracket 93 secured to the underside of supporting arm 103 so that piece 92 is free to rotate about the point 94 when pressure is exerted against its surface 104. Such pressure may be exerted by a shaft 96 which is actuated by piston-cylinder device 86, equivalent to that shown in FIG. 2. When shaft 96 moves forward, piece 92 is rotated in a counterclockwise direction. At the outer end of piece 92, there is attached a gripping finger 95 which is free to rotate about the point 105. If shaft 96 is urged forward and piece 92 is rotated counterclockwise, gripping finger 95 is moved toward the underside of supporting arm 103 so that a workpiece 106 may be grasped between upper surface 107 of gripping finger 95 and lower surface 99 of supporting arm 103. If a workpiece 106 is present, pressure is exerted upon surface 107 to cause gripping finger 95 to rotate clockwise about point 105, whereby a normally opened contact 98 of microswitch 97 is caused to close by the upward pressure of surface 100 of gripping finger 95 upon which contact 98 rests. If a workpiece 106 is not present, gripping finger 95 will not rotate and microswitch 97 will not operate. Thus, microswitch 97 acts as a sensing element which determines the presence or absence of a workpiece in the prehensile member.

In order to best explain the sequence of operations which may be possible with the welding apparatus of the invention, there is illustrated in FIG. 4 a schematic diagram of the interconnections among the switches, relay elements, solenoid valves and actuation devices of the invention which are required for a specific sequence of operations. For the purposes of illustration, the connections shown in FIG. 4 are set up to provide a sequence of operations for welding together two workpieces which are to be fed from some other stage of production to the welding apparatus and which are to be fed, in turn, to a subsequent stage of production.

The general sequence of operations required to accomplish such a welding process is described as follows. Welding arms 16 and 18 and middle arm 26 are initially located in their outwardly swung positions. In these positions, workpieces are fed from another stage of production (not shown) to a location adjacent to prehensile members of arms 16 and 18. The workpieces are grasped by the prehensile members associated with each electrode arm and the arms are then swung inwardly to the welding position. Arm 16 is raised and arm 18 is lowered to cause the workpieces and electrodes to come together at the welding position. At that time, middle arm 26 is swung inwardly and its prehensile member 102 also grasps the workpieces. The workpieces are then welded together in accordance with conventional welding and timing circuits. After the completion of the welding operation, the prehensile members of welding arms 16 and 18 release their hold on the workpieces and welding arms 16 and 18 are swung outwardly to their original positions. The middle arm whose prehensile member continues to hold the welded workpieces is, then, caused to swing to its outward position where the welded pieces are released to be picked up for the next stage of production.

In order to effectuate the above sequence of operations, the circuit shown in schematic and block diagram form in FIG. 4 is utilized. FIG. 4 includes a plurality of relay coils, relay contacts, switches, and solenoid valve coils. For clarity, each of the relay contacts are designated by a numeral and letter combination. The numeral in each case is the same as the numeral designating its corresponding relay coil. For example, relay contacts 108A, 108B and 108C are associated with relay coil 108.

In the figure, there is shown a source 101 of relay and solenoid voltage excitation, the output voltage of which is provided across terminals 54 and 55, terminal 55 being connected to ground. Terminal 54 is connected to one side of a relay coil 108. The other side of relay coil 108 is connected to ground through a pair of parallel paths, one of which comprises a series connection of the normally opened relay contacts 108A and the normally closed relay contacts 120A, and the other of which comprises a series connection of microswitches 66, 82 and "On-off" switch 109. Relay coils 110 and 111 are connected in parallel paths from terminal 54 to ground through normally opened relay contacts 108B and 108C, respectively. Solenoid valves 112 and 113 are connected in parallel paths from terminal 54 to ground through normally opened relay contacts 110A and 111A, respectively.

A relay coil 129 is connected from terminal 54 to ground through a pair of parallel paths, one of which comprises a series connection of microswitch 97 and microswitch 115, and the other of which comprises a series connection of normally opened relay contacts 129A and microswitches 76 and 77. A solenoid valve 63 is connected from terminal 54 to ground through normally opened relay contacts 129B. Relay coils 117 and 118 are connected in parallel with each other and their common connections are connected from terminal 54 to ground through normally closed relay contacts 120B and microswitch 67.

Solenoid valves 88 and 89 are connected from terminal 54 to ground through normally opened relay contacts 117A and 118A, respectively. Relay coil 122 is connected from terminal 54 to ground through normally closed relay contacts 120B, microswitches 75 and 78, and pressure switch 37. Solenoid valve 123 is connected from terminal 54 to ground through normally opened relay contacts 122A. Relay Coil 124 is connected from terminal 54 to ground through a pair of parallel paths, one of which includes a microswitch 81 and the other of which comprises a series connection of normally opened relay contacts 124A and 120C.

Solenoid valve 125 is connected from terminal 54 to ground through normally opened relay contacts 124B. Relay coil 120 is connected from terminal 54 to ground through normally opened relay contacts 126A. One side of relay 120 is connected to a common connection at one side of relay coils 117 and 118 through normally opened relay contacts 120D. Welding and timing circuits 127 are caused to operate upon the closing of normally opened microswitch 128. Such welding and timing circuits are conventional in the art and, therefore, are not described in detail here. They are constructed so that, at the end of the welding operation, a relay coil 126 is momentarily energized.

Having, thus, described the interconnections between relays, solenoid, valves, and switches that are involved, it is now possible to describe more specifically the sequence of operations required for welding two workpieces together.

At the beginning of the welding sequence of operations, welding arms 16 and 18 and middle arm 26 are in their outwardly swung positions so that switches 66 and 82 are closed. Thus, when "On-off" switch 109 is closed, relay coil 108 is energized. Energization of relay 108 causes normally opened relay contacts 108A to close, and relay 108 is held in its energized position through contacts 108A and normally closed contacts 120A.

Energization of relay 108 causes normally opened contacts 108B and 108C to close and, thus, causes energization of relay coils 110 and 111. Energization of relays 110 and 111 causes normally opened relay contacts 110A and 111A to close. The closure of these latter contacts causes the energization of solenoid valves 112 and 113. Energization of solenoid valves 112 and 113 operates piston-cylinder devices 84 and 86 which actuate prehensile members 85 and 87, associated with welding arms 16 and 18, respectively.

Thus, members 85 and 87 are caused to close so that workpieces which are to be welded are grasped in a manner described with reference to FIG. 3. If workpieces are present and grasped by prehensile members 85 and 87, microswitches 97 and 115 close and, thus, energization of relay coil 129 is accomplished. However, if workpieces are not present in either one or both of the gripping members, one or both microswitches 97 and 115 remain open and further operation of the welding process is stopped at this point. The structural operation of these workpieces sensing microswitches was explained above in more detail in conjunction with the drawing shown in FIG. 3.

Energization of relay coil 129 causes normally opened relay contacts 129B to close. Closure of contacts 129B causes solenoid valve 63 to be energized. Energization of solenoid valve 63 causes the actuation of piston-cylinder device 62 (shown in FIG. 2) to move rack 22 rearward and, thus, to cause welding arms 16 and 18 to swing inwardly toward each other to the required welding position. When arms 16 and 18 swing toward each other to the welding position, microswitch 66 opens and microswitch 67 closes. Closure of microswitch 67 energizes relay coils 117 and 118.

Energization of relays 117 and 118 causes normally open contacts 117A and 118A to close. Closure of these contacts causes the energization of solenoid valves 88 and 89. Energization of solenoid valves 88 and 89 actuates piston-cylinder devices 71—74 thereby raising welding arm 16 and lowering welding arm 18. This action brings the electrodes and workpieces together into the welding position. The movement of welding arm 16 upward and welding arm 18 downward causes switches 75, 76, 77, and 78 to close. If sufficient pressure is present for welding, pressure switch 37, which is normally opened, also closes. The closure of pressure switch 37 and switches 75 and 78 causes relay coil 122 to become energized. Energization of relay 122 causes normally open relay contacts 122A to close. Closure of contacts 122A causes solenoid valve 123 to become energized.

Energization of solenoid valve 123 actuates piston-cylinder device 80 which, thereby, causes middle arm 26 to be swung inwardly toward the welding position of electrodes 17 and 19. When middle arm 26 swings inwardly, microswitch 81 closes and microswitch 82 opens.

Closure of microswitch 81 causes relay coil 124 to be energized which causes normally opened contacts 124B to close and, thus, energize solenoid valve 125. Energization of solenoid valve 125 actuates piston-cylinder device 79 so as to cause middle arm prehensile member 102 to grasp the workpieces which are to be welded. If the member 102 does not sense the presence of the workpieces, middle arm sensing switch 128 remains open and any further sequence of operations is stopped at this point. If, however, the middle arm gripping member senses the presence of workpieces, sensing microswitch 128 closes.

Closure of microswitch 128 actuates the welding and timing circuits to provide a welding current for the electrodes to cause the workpieces to be welded together. Since the operation of welding circuits is well known, it is not considered necessary to describe in any more detail this phase of the operation. Any conventional welding and timing circuits may be used to provide a desired welding cycle of operation. At the end of the welding cycle, relay coil 126 is energized. Relay 126 is a conventional microsecond relay which is energized only momentarily for a preselected period of time. Momentary energization of relay 126 may be brought about by any convenient circuit means associated with the operation of welding and timing circuits 127.

Upon the momentary energization of relay coil 126, the normally opened relay contacts 126A are momentarily closed. Closure of contacts 126A causes relay coil 120 to become energized. The energization of relay coil 120 is maintained by the closure of normally opened relay contacts 120D and closed microswitch 67. Energization of relay 120 causes normally closed contacts 120A and 120B to open and normally opened contacts 120C and 120D to close. Opening of normally closed contacts 120A causes relay coil 108 to become de-energized. De-energization of relay 108 causes relays 110 and 111 to be de-energized. De-energization of relays 110 and 111 causes solenoids 112 and 113 to be de-energized and de-energization of solenoids 112 and 113 causes prehensile members 85 and 87 of welding arms 16 and 18, respectively, to release their hold on the workpieces which are welded together. At this point, it should be recalled that the workpieces are still held by prehensile member 102 of middle arm 26.

Opening of normally closed contact 120B causes relay coils 117 and 118 to become de-energized. De-energization of relay coils 117 and 118 causes de-energization of solenoid valves 88 and 89, which, in turn, causes arm 16 to be lowered and arm 18 to be raised. This vertical motion of arms 16 and 18 cause switches 75, 76, 77 and 78 to open. The release of workpieces by the prehensile members of welding arms 16 and 18 causes microswitches 97 and 115 to open.

Opening of switches 75, 76, 77, 78, 97, and 115 causes relay coil 129 to become de-energized, which, in turn, causes de-energization of solenoid valve 63. De-energization of solenoid valve 63 causes welding arms 16 and 18 to swing outwardly to their initial positions.

Simultaneously with the de-energization of relay 129 there is a de-energization of relay 122 which causes a de-energization of solenoid valve 123. When solenoid valve 123 is de-energized, middle arm 26 swings outwardly to its initial position and carries with it, in its prehensile member 102, the workpieces that have been welded together. When middle arm 26 swings outwardly, switch 81 opens.

When the welding arms 16 and 18 swing out, relay 120, which had been held closed through contacts 120D and microswitch 67, is now de-energized due to the opening of microswitch 67. De-energization of relay 120 and the opening of switch 81 causes relay coil 124 to become de-energized.

De-energization of relay coil 124 causes solenoid valve 125 to become de-energized, which, in turn, causes middle arm prehensile member 102 to release the welded workpieces so that they may be picked up for the next stage of production.

At this point, since the welding arms and the middle arm are in their original outwardly swung positions, switches 66 and 82 are again closed and the system is now ready to repeat the operation just described to weld another pair of workpieces together. As long as "On-off" switch 109 remains closed, the operation will be repeated as often as desired.

The specific embodiment of the invention shown in the figures does not necessarily represent the only configuration which may be used. For example, other structures may be utilized to provide the same functions as those of prehensile members 85, 87, and 102. Other means of mounting the swinging arms and electrodes used may be devised by those skilled in the art without departing from the scope of the invention.

Moreover, the specific sequence of operations described with reference to FIG. 4 does not represent the only welding application in which the welding apparatus of the invention may be used. For example, it is possible to arrange the interconnections of relays, solenoid valves, and switches for the purpose of welding three workpieces in such an operation. Middle arm 26 may be used to carry a third workpiece to the welding position where it may be welded to the workpieces carried by welding arms 16 and 18. Middle arm 26 can then also be utilized to pick up and carry away components which have been welded. It can be seen that, due to the flexibility of the welding apparatus of the invention, any desired sequence of operations may be used for a particular welding task to be performed. The interconnection of components required is easily accomplished by appropriate cabling at the patchboard panel 34.

The actuation of the movable elements of the apparatus need not necessarily be brought about by the hydraulic actuation means described above. Other mechanical means which may utilize springs, and the like, may be devised by those skilled in the art to accomplish the same functions as do the actuation devices specifically mentioned herein.

The invention may be adapted for handling articles for other than welding processes. The apparatus may be utilized in an assembling process wherein a plurality of articles are to be joined together by means other than welding, said joining means being incorporated as part of the apparatus. The apparatus may also be adapted to perform processes other than the joining together of articles. For example, the invention may be used to pick up articles from a plurality of production line positions and bring them together, either simultaneously or in sequence, to an operating position where they are to be processed. While in the operating position, for example, the articles may be stamped with a serial number or painted in some specific manner, the stamping or painting devices being incorporated as part of the apparatus and arranged to be actuated in sequence with the movable arms and prehensile members of the invention. Other processes in which the invention may be used will occur to those skilled in the art within the scope of the invention.

Thus, the invention is not to be construed as limited to the specific embodiments shown and described herein except as defined by the appended claims.

What is claimed is:

1. A welding apparatus comprising a plurality of movable arms including at least one pickup arm; welding electrodes mounted on two of said arms other than said pickup arm; prehensile members attached to said plurality of movable arms for holding workpieces to be welded; means for sensing the presence of workpieces in said prehensile members; first actuation means for moving said arms having welding electrodes into and away from a welding position; second actuation means for moving said pickup arm into and away from said welding position; third actuation means for causing said prehensile members to grasp and release said workpieces; means for supplying a welding current to said electrodes for welding said workpieces; and means for selectively controlling the sequence of operations of said first actuation means, said second actuation means, said third actuation means, and said welding current supply means.

2. A welding apparatus comprising a pair of movable welding arms; welding electrodes mounted on said welding arms; first and second prehensile members attached to said welding arms for holding workpieces to be welded; a movable middle arm; a third prehensile member attached to said middle arm; first actuation means for moving said welding arms into and away from a welding position;

second actuation means for causing said welding arm prehensile members to grasp and to release said workpieces; third actuation means for moving said middle arm toward and away from said welding position; fourth actuation means for causing said middle arm prehensile member to grasp and to release said workpieces; means for supplying a welding current to said electrodes for welding said workpieces; and means for selectively controlling the sequence of operations of said first, second, third, and fourth actuation means and of said welding current supply means.

3. A welding apparatus comprising a pair of movable welding arms; welding electrodes mounted on said welding arms; first and second prehensile members attached to said welding arms for holding workpieces to be welded; a movable middle arm; a third prehensile member attached to said middle arm; first actuation means for moving said welding arms in a substantially horizontal plane into and away from a welding position; second actuation means for causing said first and second prehensile members to grasp and to release said workpieces; third actuation means for moving said welding arms toward and away from each other in a substantially vertical plane; fourth actuation means for moving said middle arm toward and away from said welding position; fifth actuation means for causing said third prehensile member to grasp and to release said workpieces; means for supplying a welding current to said electrodes for welding said workpieces; and means for selectively controlling the sequence of operations of said first, second, third, fourth, and fifth actuation means and of said welding current supply means.

4. A welding apparatus comprising a pair of movable welding arms; welding electrodes mounted on said welding arms; first and second prehensile members attached to said welding arms for holding workpieces to be welded; a movable middle arm; a third prehensile member attached to said middle arm; first hydraulic actuation means for moving said welding arms into and away from a welding position, second hydraulic actuation means for causing said first and second prehensile members to grasp and to release said workpieces; third hydraulic actuation means for moving said middle arm toward and away from said welding position, fourth hydraulic actuation means for causing said third prehensile member to grasp and to release said workpieces; means for supplying a welding current to said electrodes for welding said workpieces; and means including a plurality of interconnected relays, solenoid valves, and switches for selectively controlling the sequence of operations of said first, second, third, and fourth actuation means and of said welding current supply means.

5. A welding apparatus comprising a pair of movable welding arms; welding electrodes mounted on said welding arms; first and second prehensile members attached to said welding arms for holding workpieces to be welded; a movable middle arm; a third prehensile member attached to said middle arm; first hydraulic actuation means for moving said welding arms into and away from a welding position, second hydraulic actuation means for causing said first and second prehensile members to grasp and to release said workpieces; third hydraulic actuation means for moving said middle arm toward and away from said welding position, fourth hydraulic actuation means for causing said third prehensile member to grasp and to release said workpieces; means for supplying a welding current to said electrodes for welding said workpieces; means including a plurality of relays, solenoid valves, and switches for controlling the operations of said first, second, third, and fourth actuation means and of said welding current supply means; and means for selectively interconecting said plurality of relays, solenoid valves, and switches whereby said actuation means are operated in a controlled sequential manner.

6. A welding apparatus comprising a pair of pivotally mounted welding arms; welding electrodes mounted on said welding arms; first and second prehensile members attached to said welding arms for holding workpieces to be welded; a pivotally mounted middle arm; a third prehensile member attached to said middle arm; first actuation means for rotating said welding arms whereby said welding arms are swung toward and away from a welding position, second actuation means for causing said first and second prehensible members to grasp and to release said workpieces; third actuation means for rotating said middle arm whereby said middle arm is swung toward and away from said welding position, fourth actuation means for causing said third prehensile member to grasp and to release said workpieces; fifth actuation means for moving said welding electrodes toward and away from each other; means for supplying a welding current to said electrodes for welding said workpieces; means for selectively controlling the sequence of operations of said first, second, third, fourth, and fifth actuation means and of said welding current supply means.

References Cited in the file of this patent

UNITED STATES PATENTS

| | | |
|---|---|---|
| 2,359,434 | McNeil | Oct. 3, 1944 |
| 2,424,892 | Malke | July 29, 1947 |
| 2,454,190 | Lurcott | Nov. 16, 1948 |
| 2,683,205 | Yanchenko | July 6, 1954 |